(12) United States Patent
Chavez et al.

(10) Patent No.: US 7,390,013 B2
(45) Date of Patent: Jun. 24, 2008

(54) AIRBAG MODULE

(75) Inventors: Spencer W. Chavez, Linden, MI (US); Michael J. Lange, St. Clair Shores, MI (US)

(73) Assignee: TK Holdings Inc., Aubrun Hills, MI (US)

(*) Notice: Subject to any disclaimer, the term of this patent is extended or adjusted under 35 U.S.C. 154(b) by 379 days.

(21) Appl. No.: 11/076,159

(22) Filed: Mar. 10, 2005

(65) Prior Publication Data

US 2006/0202446 A1  Sep. 14, 2006

(51) Int. Cl.
*B60R 21/20* (2006.01)

(52) U.S. Cl. .................... 280/728.3; 280/731

(58) Field of Classification Search ............ 280/728.3, 280/731, 728.1, 732
See application file for complete search history.

(56) References Cited

U.S. PATENT DOCUMENTS

| | | | | |
|---|---|---|---|---|
| 4,903,986 A * | 2/1990 | Cok et al. | ............ | 280/728.2 |
| 5,013,064 A * | 5/1991 | Miller et al. | ............ | 280/730.1 |
| 5,060,971 A * | 10/1991 | Nanbu et al. | ............ | 280/728.3 |
| 5,855,391 A * | 1/1999 | Holland | ............ | 280/728.3 |
| 5,913,534 A * | 6/1999 | Klingauf | ............ | 280/728.3 |
| 6,082,759 A * | 7/2000 | Faigle et al. | ............ | 280/728.3 |
| 6,247,722 B1 * | 6/2001 | Brodi et al. | ............ | 280/728.3 |
| 6,502,852 B2 * | 1/2003 | Kassman et al. | ............ | 280/728.3 |
| 6,540,252 B2 * | 4/2003 | Mu et al. | ............ | 280/728.3 |
| 6,793,238 B2 * | 9/2004 | Schneider et al. | ............ | 280/728.3 |
| 6,802,528 B2 | 10/2004 | Short et al. | | |
| 6,848,705 B2 * | 2/2005 | Schneider et al. | ............ | 280/728.3 |

* cited by examiner

*Primary Examiner*—Ruth Ilan
(74) *Attorney, Agent, or Firm*—Foley & Lardner LLP

(57) ABSTRACT

An airbag module includes a cover having an I-shaped tear line. The I-shaped tear line has a first tear seam parallel to and spaced apart from a second tear seam. A third tear seam is continuous with and perpendicular to the first tear seam and the second tear seam. When an airbag is inflated the tear line separates and the airbag deploys there through.

10 Claims, 7 Drawing Sheets

FIG. 1

PRIOR ART

AIRBAG MODULE

BACKGROUND

The present invention relates to an airbag module that includes a frangible cover.

In general, airbags are employed in vehicles as secondary restraint mechanisms to operate in conjunction with seatbelts in order to provide protection for the vehicle occupant during a collision event. Frontal impact airbags are used typically in the steering column and in the dashboard to protect the driver and the front seat passengers. These airbags are designed to inflate over a 15-20 millisecond time frame and to deflate as the occupants impacts the inflated airbag.

An airbag system normally includes an airbag module that includes an airbag and an inflator. The system may also include a sensor for detecting a collision event and for communicating with the airbag module. Frontal airbags are normally housed within an airbag module located in the steering column or steering wheel of the vehicle and are part of an airbag system. The airbag module also may include an airbag cover, through which the airbag is deployed during a collision event.

The airbag is inflated upon a collision event by the activation of the inflator, which generates a large volume of gas over a period of milliseconds. The frontal airbag must be able to inflate quickly to provide a cushion for the occupant who may be rapidly moving towards the front the vehicle.

Frontal airbags also operate to address the situation where a vehicle occupant is "out of position", i.e. not located squarely in their seat with their back against the seatback. Also, when the vehicle occupant is much smaller or much larger than an average vehicle occupant as they are naturally "out of position" due to their size. One example of which is known in the industry as the five-percent female.

SUMMARY OF THE INVENTION

The present invention relates to an airbag cover adapted for deployment of an airbag when a vehicle occupant is in an out of position scenario. In accordance with an embodiment of the present invention an airbag cover, adapted to be a component of an airbag module in an airbag system, has a top portion, a bottom portion, and a front portion. The airbag cover further comprises a tear line for allowing an airbag to exit the airbag.

According to an embodiment of the present invention, the tear line may comprise a first tear seam, a second tear seam, and a third tear seam oriented to substantially form an I shape. The first tear seam is located laterally (i.e. horizontally) across the airbag cover. The second tear seam is spaced apart therefrom and located parallel thereto the first tear seam. The third tear seam is located on the front portion of the airbag, perpendicular to the first tear seam and the second tear seam thus forming a substantially continuous tear line.

When the airbag inflates, the tear line rips to allow the airbag to exit the airbag cover. The torn tear line defines panels or doors in the airbag cover which open as the airbag inflates.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

According to the present invention, an airbag module is provided. In an exemplary embodiment, the module includes a cover. The airbag module also includes a housing in which an airbag is disposed in a folded state and the cover through which the airbag passes during deployment. The cover may include an I-shaped tear line which, during deployment of the airbag may define two hinged flaps or doors though which the airbag passes.

Figure 1:
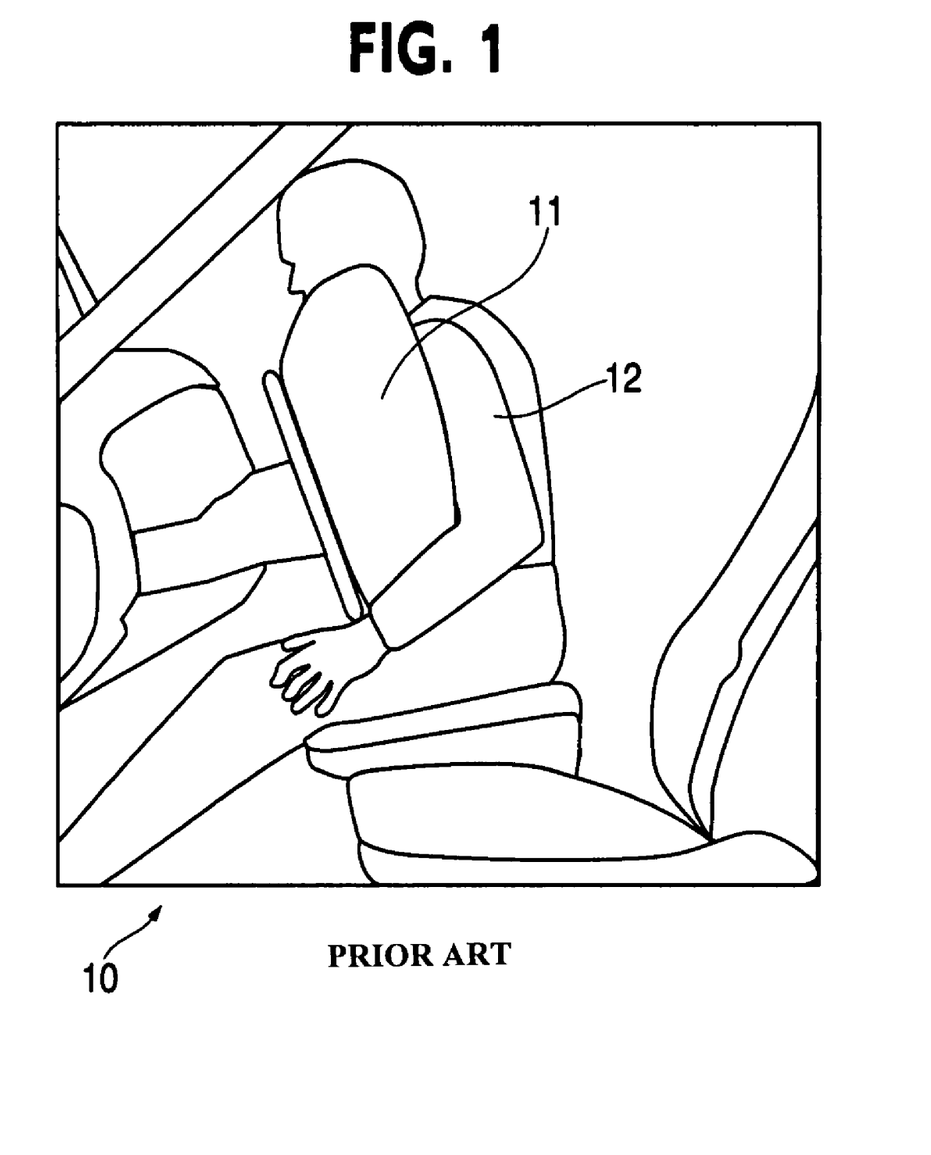
FIG. 1 is a side view of a conventional airbag deploying through a cover having an H-shaped tear seam.

Referring now to the drawings, an embodiment of the present invention will be described. FIG. 1 discloses an exemplary airbag system 10. The system 10 includes a module having a cover that includes an H-shaped tear seam (not shown). When the airbag 11 deploys, as shown in FIG. 1, the airbag 11 essentially deploys from the center outward toward an occupant 12.

Figure 2A:
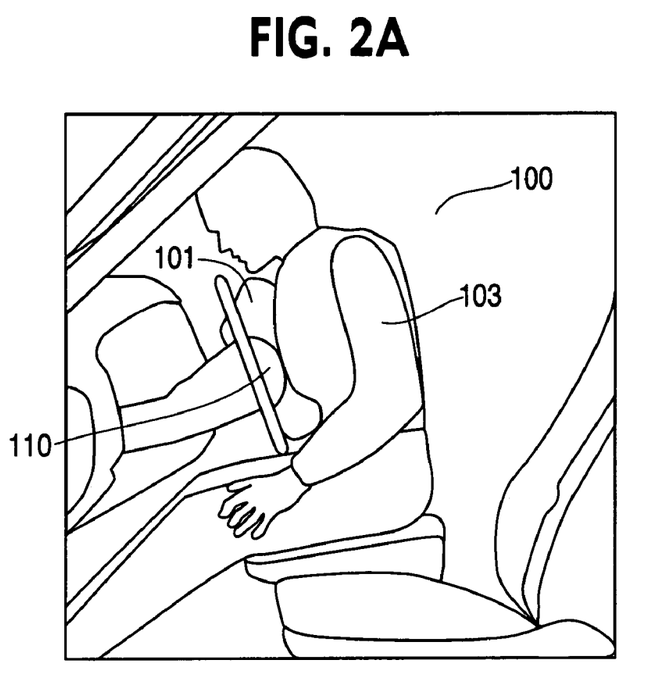
FIG. 2A is a side view of an airbag deploying through a cover.
Figure 2B:
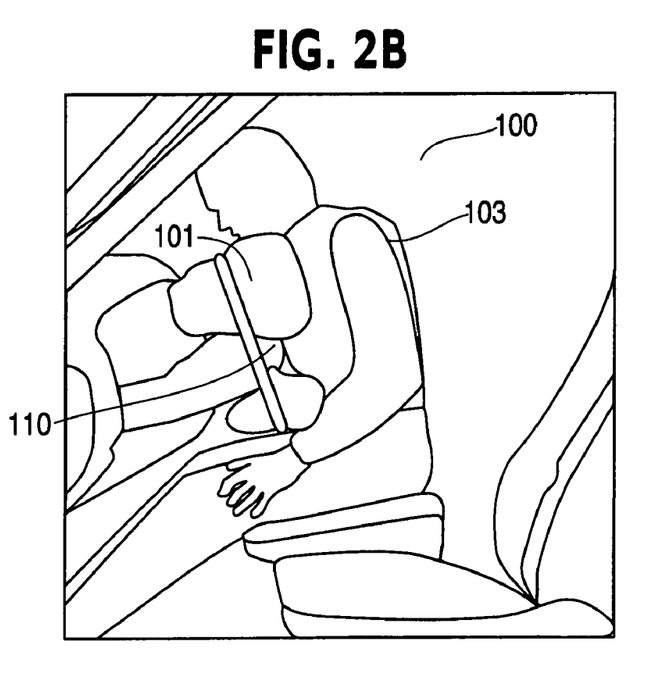
FIG. 2b is a side view of the airbag of FIG. 2A as it continues to deploy through the cover.

In contrast, an airbag system 100 in accordance with an embodiment of the present invention is shown in FIGS. 2A and 2B. The system 100 includes a module 110. The module 110 includes an airbag 101 and a cover 111. When the airbag 101 is deployed, the airbag 101 deploys through a top 104 of the cover 111 and/or a bottom 105 of the cover 111 prior to or simultaneous with deploying from the middle 106 of the cover 111 outward to the occupant 103, thus reducing the force of the deployment towards the occupant 103.

Figure 3:
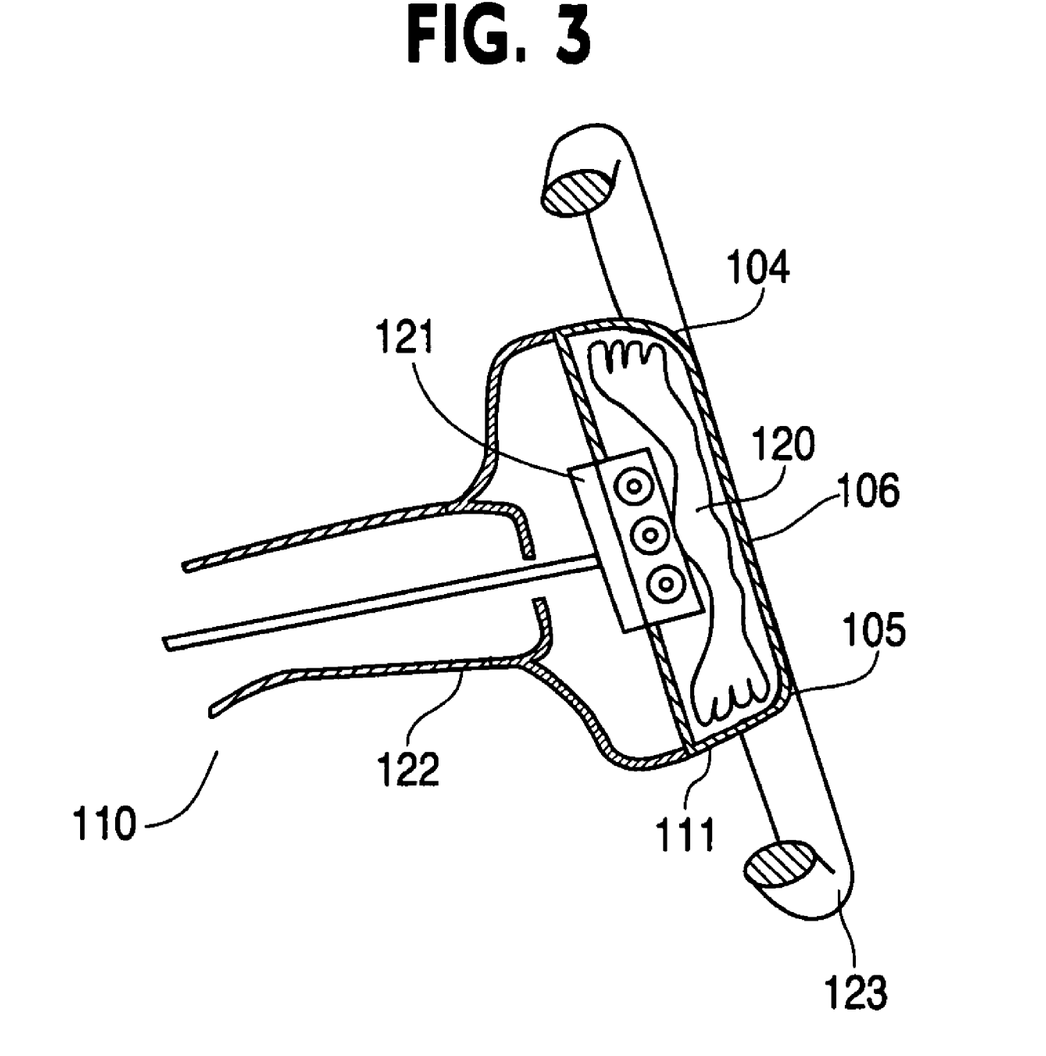
FIG. 3 is a cross-sectional view of an airbag system.

As shown in FIG. 3, the airbag module 110 is adapted to contain a folded airbag 120 and to allow for deployment of the folded airbag 120 upon inflation. An inflation mechanism 121 is provided in communication with the folded airbag 120. In one embodiment, the airbag module 110 is positioned along the steering column 122, in the middle of the steering wheel 123.

Figure 7:
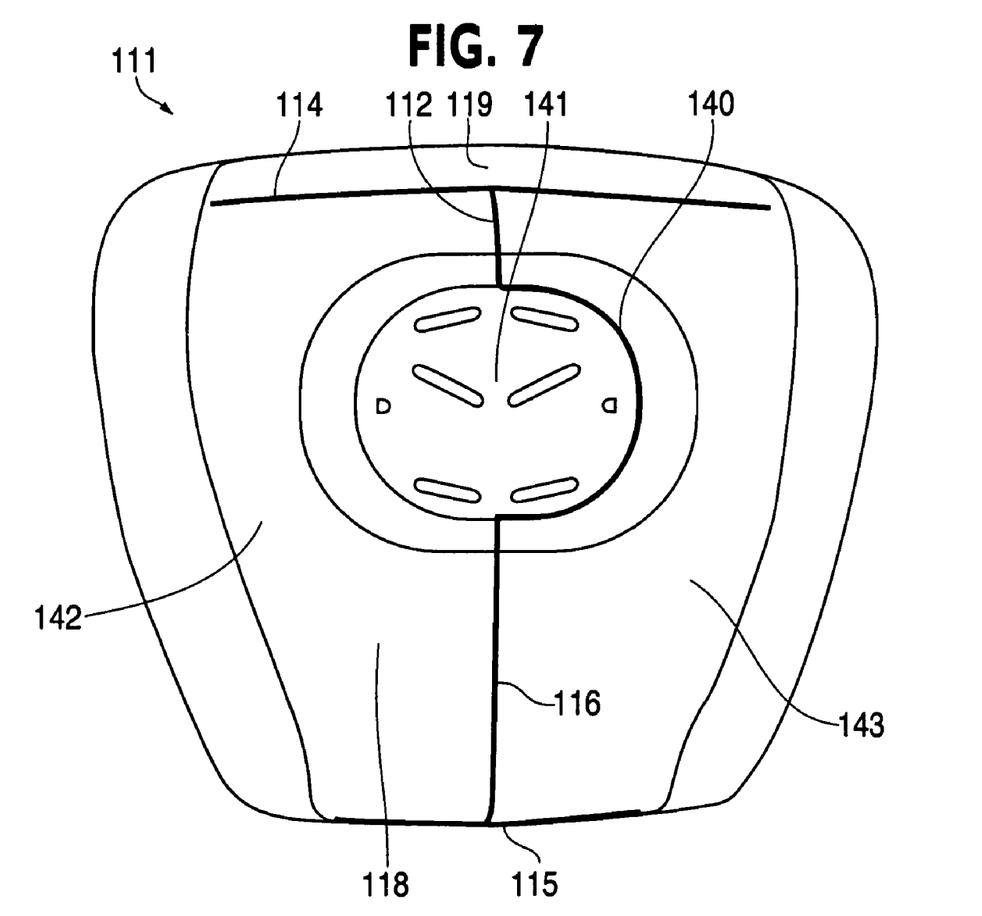
FIG. 7 is a front view of a cover for an alternative embodiment of the airbag module.

According to an embodiment of the present invention a tear line 112 is formed on the cover 111. As shown in FIG. 7, the tear line 112 may be constructed of a combination of individual tear seams. A first tear seam 114 (shown in FIG. 7) and a second tear seam 115 are positioned parallel to each other. The first tear seam 114 and the second tear seam 115 are located lateral or horizontally across the airbag cover 111 (i.e., substantially parallel to the floor of the vehicle). A third tear seam 116 is formed perpendicular to and connects the first tear seam 114 and the second tear seam 115 to form a substantially continuous tear line 112. The third tear seam 116, as shown in FIG. 7, is located on the front or emblem side 118 of the airbag module 110.

Figure 4:
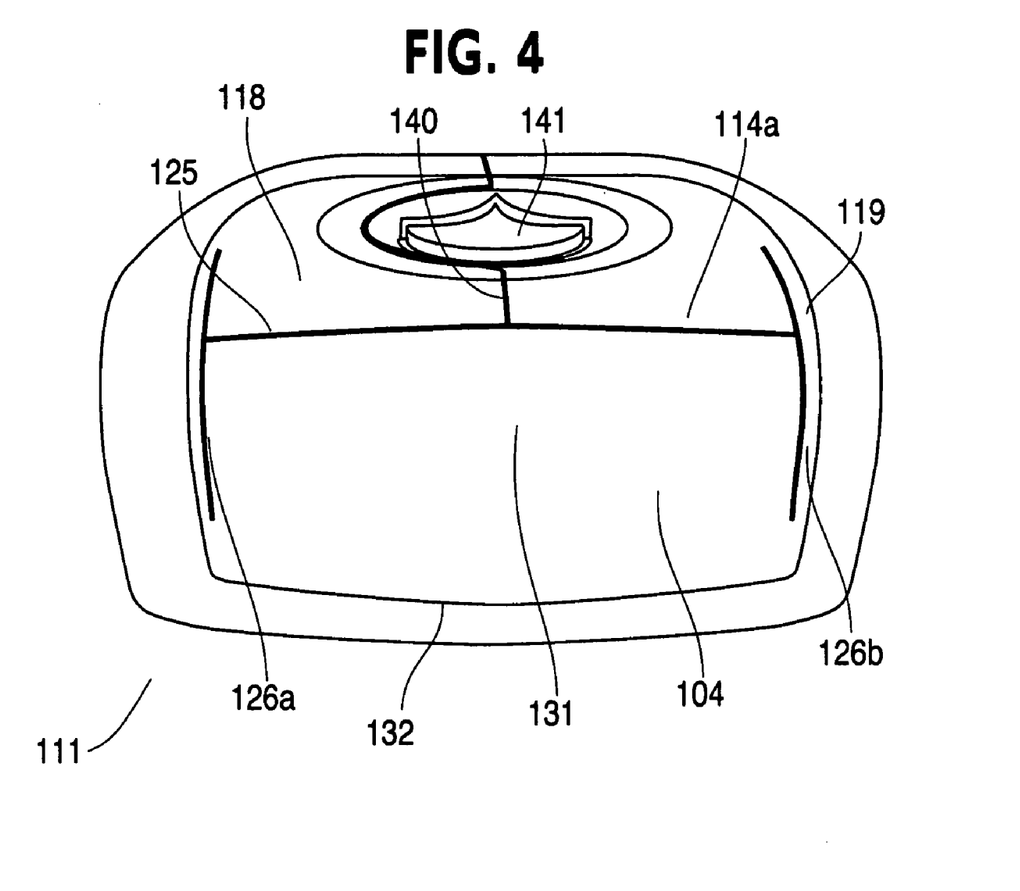
FIG. 4 is a top view of a cover for an airbag module.

In one embodiment shown in FIG. 7, the tear line 112 is formed substantially into an I-shape as a whole from the occupant's view. In an alternative embodiment shown in FIGS. 4-6, the tear line 112 forms a modified "I" shape as described below in greater detail.

In one embodiment, the first tear seam 114 extends horizontally across a majority of the width of the airbag cover 111. In one embodiment, the first tear seam 114 is located on the front portion 118 of the airbag cover 111. In an alternative embodiment, the first tear seam 114 is located on the top portion 104 of the airbag cover 111. In an alternative embodiment, the first tear seam 114 is located on a top front edge 119 of the airbag cover 111. The top front edge 119 is formed by the junction of the front portion 118 of the airbag cover 111 and the top portion 104 of the airbag cover. In one embodiment, the first tear seam 114 is linear. In another embodiment, the first tear seam 114 is curvilinear.

Figure 6:
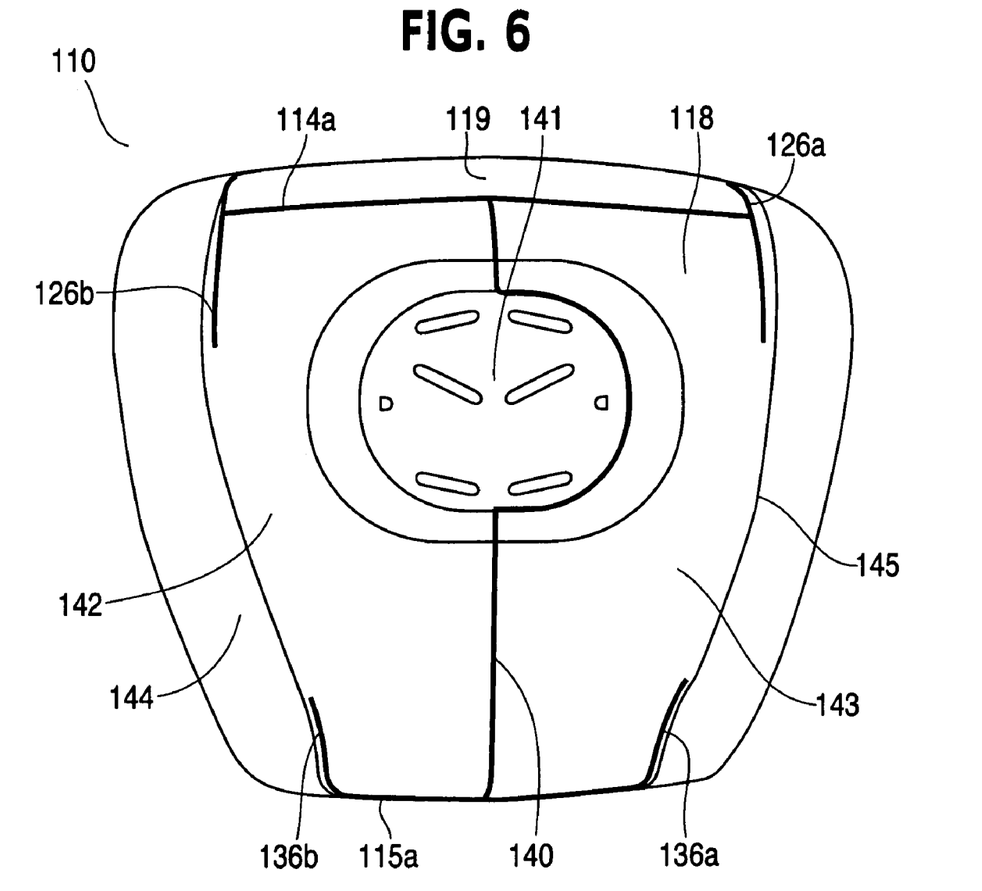
FIG. 6 is a front view of the cover airbag module of FIG. 4.

In an exemplary embodiment, the first tear seam 114a itself is substantially I-shaped, as shown in FIG. 6. In an embodiment having an I-shaped first tear seam 114a, the first tear seam 114a comprises a primary first tear seam 125 and secondary vertical first tear seams 126a, 126b located substantially perpendicular thereto. In one exemplary embodiment, the secondary vertical first tear seams 126a, 126b comprise a first secondary vertical first tear seam 126a and a second secondary vertical first tear seam 126b, respectively positioned substantially at a first end and a second end of the primary first tear seam 125 to form the I-shaped first tear seam 114a. In an exemplary embodiment, a top door 131 is provided to open at the top 104 of the airbag cover 111 as the air bag 101 is deployed. In one embodiment, the top door 131 comprises a hinged portion 132 of the cover 111. In an exemplary embodiment, the hinged portion 132 comprises a portion of the cover 111 parallel to the primary first tear seam 125 and is formed of a thinned portion of the cover 111.

The second tear seam 115 extends horizontally across a majority of the width of the cover 111 and is located substantially parallel to the first tear seam 114. In one embodiment, the second tear seam 115 is located on the front portion 118 of the cover 111. In an alternative embodiment, the second tear seam 115 is located on the bottom portion 105 of the cover 111. In an alternative embodiment, the second tear seam 115 is located on a bottom front edge of the cover 111. The bottom front edge is formed by the junction of the front portion 118 of the cover 111 and the bottom portion 105 of the cover 111. Similar to the first tear seam 114, in one embodiment the second tear seam 115 is linear. In an alternative embodiment, the second tear seam 115 is curvilinear.

Figure 5:
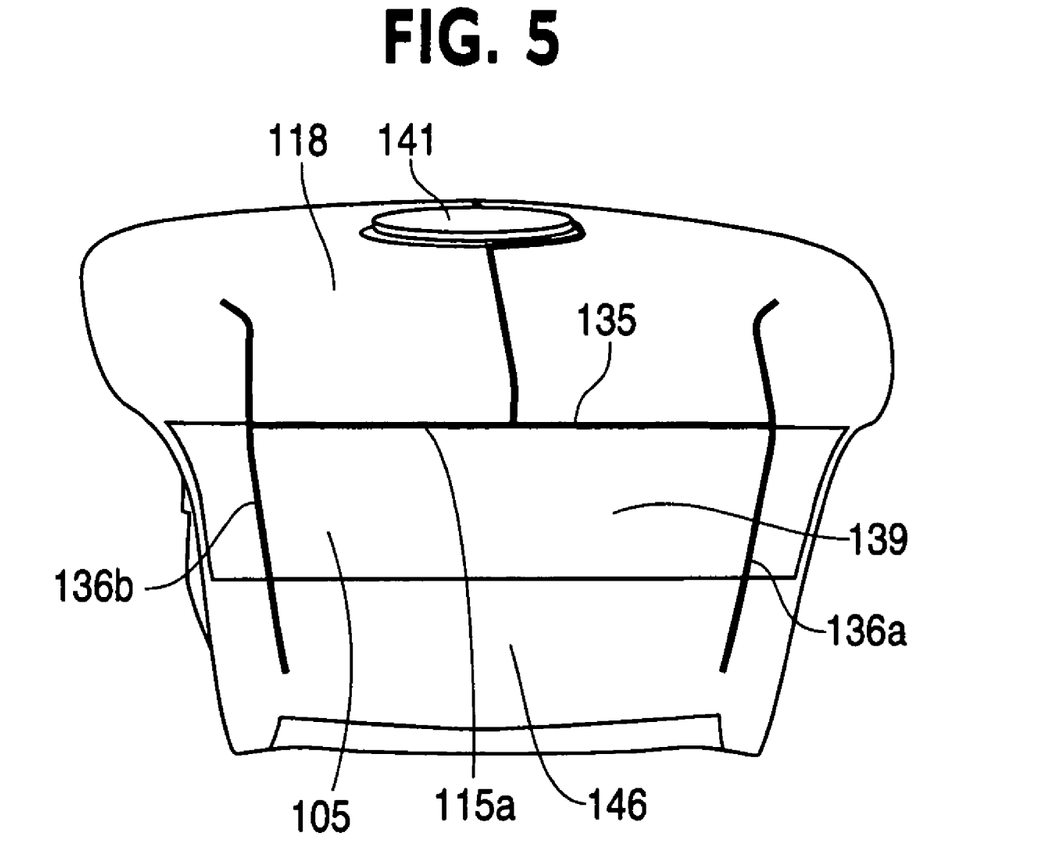
FIG. 5 is a bottom view of the cover for the airbag module of FIG. 4.

In an exemplary embodiment, the second tear seam 115a, shown in FIGS. 5 and 6, is generally I-shaped. In an embodiment having an I-shaped second tear seam 115a, the second tear seam 115a comprises a primary second tear seam 135 and secondary vertical second tear seams 136a, 136b located substantially perpendicular thereto. In one exemplary embodiment, the secondary vertical second tear seams 136a, 136b of the second tear seam 115a comprise a first secondary vertical second tear seam 136a and a second secondary vertical second tear seam 136b, respectively positioned substantially at a first end and a second end of the primary second tear seam 135 to form a continuous second tear seam 115a. In an exemplary embodiment, a bottom door 139 is provided to open at the bottom 105 of the cover 111 as the air bag 101 is deployed. In one embodiment, the bottom door 139 comprises a hinged portion 146 of the airbag cover. In an exemplary embodiment, the hinged portion 146 comprises a portion of the airbag parallel to the primary second tear seam 135 and is formed of a thinned portion of the cover 111.

The third tear seam 140 is located on the front portion 118 of the cover 111. The third tear seam 140 runs from the first tear seam 114a to the second tear seam 115a to provide the substantially continuous I-shaped tear line 112. In one embodiment, the third tear seam 140 is located substantially in the middle of the front portion 118 of the cover 111. In one exemplary embodiment, the third tear seam 140 substantially bisects the first tear seam 114 and the second tear seam 115. In one embodiment, the third tear seam 140 is linear. In an alternative embodiment, the third tear seam 140 is curvilinear such as to accommodate an emblem apparatus 141.

A first frontal door 142 and a second frontal door 143 are provided on opposite sides of the third tear seam 140. The first frontal door 142 and second frontal door 143 are defined by the tear line 112. In one embodiment, a first vertical hinged portion 144 and a second vertical hinged portion 145 are provided on the front portion 118 of the cover 111 wherein when the tear line 112 rips, two doors 142, 143 are formed which open to the left and to the right respectively. In one embodiment, hinged portions 144, 145 of the doors 142, 143 are thinned portions and are relatively thinner than other portions of the cover 111. The hinged portions 144, 145 are adapted to serve as hinge mechanisms of the doors 142, 143 when the cover 111 is torn along the tear line 112 during airbag deployment.

In one embodiment the first tear seam 114 is located in a first plane, the second tear seam 115 is located in a second plane, and the third tear seam 140 is located in a third plane. For example, in one embodiment, the first plane is defined by the top portion 104 of the cover 111, the second plane is defined by the bottom portion 105 of the airbag cover, and the third plane is defined by the front portion 118 of the cover 111.

In case of the front collision of the vehicle, the inflator mechanism is activated and the vehicle's airbag is deployed by the expansion gas supplied from the inflator. The cover 111 is torn along the substantially I-shaped tear line 112 and a pair of vertically hinged doors 142, 143 open upon inflation and deployment of the vehicle's airbag 101. In an alternative embodiment having an I-shaped first tear seam 114a and an I-shaped second tear seam 115a, a horizontally hinged top door 131 opens at the top 104 of the cover 111 and a horizontally hinged bottom door 139 opens at the bottom 105 of the airbag cover.

As shown in FIGS. 2A and 2B, the vehicle's airbag is deployed out of the housing, through the cover 111 via the hinged doors. When deployed, the airbag 101 projects toward the occupant crash protection area defined in front of the occupant 103 into the inflated and deployed state.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module, comprising:
   an airbag; and
   a cover having a top portion, a bottom portion, and a front portion;
   wherein, the cover comprises:
   a substantially continuous tear line having a first I-shaped tear seam, a second I-shaped tear seam, and a third tear seam;

wherein the first I-shaped tear seam is located horizontally on the airbag cover so that the first I-shaped tear seam forms a top door on the top portion of the cover when the first I-shaped tear seam is torn;

wherein the second I-shaped tear seam is located substantially parallel to the first I-shaped tear seam so that the second I-shaped tear seam forms a bottom door on the bottom portion of the cover when the second I-shaped tear seam is torn; and wherein the third tear seam is located vertically on the cover and running from the first I-shaped tear seam to the second I-shaped tear seam to form the substantially continuous tear line, wherein the third tear seam forms a first and second door on the front portion of the cover when the third tear seam is torn;

wherein the cover is configured so that the first I-shaped tear seam and the second I-shaped tear seam preferably tear before the third tear seam so that the airbag deploys through the top door and bottom door prior to deploying through the front portion of the cover.

2. The airbag module of claim 1, wherein the third tear seam is curvilinear.

3. The airbag module of claim 1, wherein the cover further comprises a first vertical hinged portion and a second vertical hinged portion associated with and substantially parallel to the third tear seam.

4. The airbag module of claim 1, wherein the first I-shaped tear seam is located on the top portion of the cover.

5. The airbag module of claim 4, further wherein the second I-shaped tear seam is located on the bottom portion of the cover.

6. The airbag module of claim 1, wherein the second I-shaped tear seam is located on the bottom portion of the cover.

7. The airbag module of claim 1, wherein the first I-shaped tear seam is located on a top edge formed at an intersection of the front portion of the cover and the top portion of the cover.

8. The airbag module of claim 7, wherein the second I-shaped tear seam is located on a bottom edge formed at an intersection of the front portion of the cover and the bottom portion of the cover.

9. The airbag module of claim 8, wherein the cover further comprises a first vertical hinged portion and a second vertical hinged portion associated with and substantially parallel to the third tear seam.

10. The airbag module of claim 9, wherein the cover further comprises a first horizontally hinged portion associated with the first I-shaped tear seam and a second horizontally hinged portion associated with the second I-shaped tear seam.

* * * * *

UNITED STATES PATENT AND TRADEMARK OFFICE
CERTIFICATE OF CORRECTION

PATENT NO.        : 7,390,013 B2
APPLICATION NO.   : 11/076159
DATED             : June 24, 2008
INVENTOR(S)       : Spencer W. Chavez and Michael J. Lange Page 1 of 1

It is certified that error appears in the above-identified patent and that said Letters Patent is hereby corrected as shown below:

ON THE TITLE PAGE:

Item (73) the Assignee information should read:

-- (73)   Assignee:    TK Holdings Inc., Auburn Hills, MI (US) --

Signed and Sealed this

Seventh Day of October, 2008

JON W. DUDAS
*Director of the United States Patent and Trademark Office*